US012628821B2

(12) United States Patent
Monteiro et al.

(10) Patent No.: US 12,628,821 B2
(45) Date of Patent: May 19, 2026

(54) AGRICULTURAL ADJUVANT

(71) Applicant: ORO AGRI, INC., Fresno, CA (US)

(72) Inventors: Sara Alexandra Valadas Silva Monteiro, Pamela (PT); Carol Pullen, Amsterdam (NL)

(73) Assignee: ORO AGRI INC., Fresno, CA (US)

( * ) Notice: Subject to any disclaimer, the term of this patent is extended or adjusted under 35 U.S.C. 154(b) by 657 days.

(21) Appl. No.: 17/756,355

(22) PCT Filed: Nov. 26, 2020

(86) PCT No.: PCT/IB2020/061197
§ 371 (c)(1),
(2) Date: May 23, 2022

(87) PCT Pub. No.: WO2021/105930
PCT Pub. Date: Jun. 3, 2021

(65) Prior Publication Data
US 2023/0053399 A1      Feb. 23, 2023

(30) Foreign Application Priority Data

Nov. 26, 2019    (GB) ...................................... 1917213

(51) Int. Cl.
*A01N 25/04*          (2006.01)
*A01N 25/24*          (2006.01)
(Continued)

(52) U.S. Cl.
CPC ............. *A01N 25/04* (2013.01); *A01N 25/24* (2013.01); *A01N 25/30* (2013.01); *A01N 25/32* (2013.01);
(Continued)

(58) Field of Classification Search
CPC .... A61K 45/06; A61K 31/519; A61K 9/0053; A61K 2039/505; A61K 9/0097; A61K 38/13; A61K 47/26; A61K 9/0019; A61K 31/436; A61K 31/19; A61K 31/194; A61K 47/18; A61K 47/20; A61K 9/0014; A61K 9/08; A61K 31/137; A61K 31/5377; A61K 2039/54; A61K 2039/542; A61K 31/4045; A61K 31/4196; A61K 38/193; A61K 39/395; A61K 47/12; A61K 8/22; A61K 8/25; A61K 9/0009; A61K 2300/00; A61K 31/437; A61K 31/4985; A61K 33/00; A61K 47/10; A61K 48/005; A61K 48/0066; A61K 9/107; A61K 9/19; A61K 47/02; A61K 47/52; A61K 48/0075; A61K 9/0031; A61K 2039/545; A61K 2800/86; A61K 31/135; A61K 31/136; A61K 31/36; A61K 8/498; A61K 8/66; A61K 9/0073; A61K 9/4808; A61K 2800/31; A61K 2800/782; A61K 31/397; A61K 31/40;

A61K 31/4184; A61K 31/4245; A61K 31/428; A61K 31/4545; A61K 31/46; A61K 31/496; A61K 31/501; A61K 31/5025; A61K 31/505; A61K 31/506; A61K 31/541; A61K 31/551; A61K 31/553; A61K 31/573; A61K 31/606; A61K 31/69; A61K 38/00; A61K 38/08; A61K 47/183; A61K 48/0033; A61K 8/0212; A61K 8/0229; A61K 8/03; A61K 8/062; A61K 8/064; A61K 8/14; A61K 8/19; A61K 8/345; A61K 8/36; A61K 8/731; A61K 8/896; A61K 9/0004; A61K 9/0095; A61K 2800/10; A61K 2800/432; A61K 2800/5426; A61K 31/198; A61K 31/4035; A61K 31/4375; A61K 31/44; A61K 31/445; A61K 31/517; A61K 31/585; A61K 47/186; A61K 48/0041; A61K 8/34; A61K 8/342; A61K 8/361; A61K 8/416; A61K 8/442; A61K 8/466; A61K 8/732;
(Continued)

(56) References Cited

U.S. PATENT DOCUMENTS

| | | | |
|---|---|---|---|
| 6,596,779 B1 | 7/2003 | Jean-Noel et al. | |
| 2008/0214400 A1 | 9/2008 | Pullen | |

(Continued)

FOREIGN PATENT DOCUMENTS

| | | |
|---|---|---|
| CN | 105670644 A | 6/2016 |
| CN | 106689122 A | 5/2017 |

(Continued)

OTHER PUBLICATIONS

Ogonowski, Jan et al. "Nanoemulsions Based on Selected Berry Seed Oils", Technical Transactions Chemistry, 1-Ch/2016; 10.4467/2353737XCT.16.050.5312 (Year: 2016).*
(Continued)

*Primary Examiner* — Audrea B Coniglio
(74) *Attorney, Agent, or Firm* — Knobbe Martens Olson & Bear LLP

(57) ABSTRACT

An agricultural adjuvant including at least one polyphenol containing natural or synthetic oil composition, the oil including blackcurrant (*Ribes nigrum*) seed oil. The agricultural adjuvant also includes at least one anionic surfactant, at least one nonionic surfactant, and at least one pH adjuster. The agricultural adjuvant may also include water and/or additives. The agricultural adjuvant may be provided as a stable concentrate form and a stable diluted form which is an emulsion Methods of manufacturing the agricultural adjuvant, uses thereof, and agricultural compositions including the agricultural adjuvant are also included.

5 Claims, 3 Drawing Sheets

(51) Int. Cl.

| | |
|---|---|
| *A01N 25/30* | (2006.01) |
| *A01N 25/32* | (2006.01) |
| *A01N 39/04* | (2006.01) |
| *A01N 43/653* | (2006.01) |
| *A01N 47/38* | (2006.01) |

(52) U.S. Cl.
CPC ........... *A01N 39/04* (2013.01); *A01N 43/653* (2013.01); *A01N 47/38* (2013.01)

(58) Field of Classification Search
CPC .... A61K 8/922; A61K 9/0048; A61K 9/0056; A61K 9/006; A61K 9/0065; A61K 9/06; A61K 9/14; A61K 9/2009; A61K 9/2013; A61K 9/2054; A61K 9/4858; A61K 9/5123; A61K 2800/412; A61K 2800/56; A61K 2800/596; A61K 2800/75; A61K 31/045; A61K 31/164; A61K 31/167; A61K 31/18; A61K 31/185; A61K 31/20; A61K 31/201; A61K 31/335; A61K 31/343; A61K 31/381; A61K 31/4155; A61K 31/4164; A61K 31/4412; A61K 31/685; A61K 31/7012; A61K 31/7048; A61K 31/7088; A61K 31/7105; A61K 31/7115; A61K 31/728; A61K 38/05; A61K 38/10; A61K 38/4833; A61K 47/14; A61K 47/22; A61K 47/32; A61K 47/36; A61K 47/40; A61K 47/44; A61K 47/544; A61K 47/547; A61K 47/6951; A61K 48/00; A61K 8/0216; A61K 8/0233; A61K 8/0237; A61K 8/0291; A61K 8/11; A61K 8/37; A61K 8/39; A61K 8/44; A61K 8/463; A61K 8/49; A61K 8/4946; A61K 8/4973; A61K 8/4993; A61K 8/60; A61K 8/602; A61K 8/604; A61K 8/64; A61K 8/737; A61K 8/92; A61K 8/97; A61K 9/00; A61K 9/0007; A61K 9/0024; A61K 9/0043; A61K 9/0078; A61K 9/02; A61K 9/10; A61K 9/1075; A61K 9/122; A61K 9/1271; A61K 9/1272; A61K 2039/544045; A61K 2800/4375; A61K 47/342; A61K 31/4833
See application file for complete search history.

(56) References Cited

U.S. PATENT DOCUMENTS

| | | | |
|---|---|---|---|
| 2009/0192231 A1* | 7/2009 | Lemons | A01N 31/02 |
| | | | 514/738 |
| 2011/0011819 A1 | 1/2011 | Lee | |
| 2017/0127668 A1 | 5/2017 | Berg et al. | |
| 2018/0110792 A1* | 4/2018 | Chop | A61K 31/355 |

FOREIGN PATENT DOCUMENTS

| | | | | |
|---|---|---|---|---|
| CN | 106689122 | B | 4/2018 | |
| JP | 2001-524497 | A | 12/2001 | |
| JP | 2006-519072 | A | 8/2006 | |
| JP | 2019-92461 | A | 6/2019 | |
| WO | WO 1999/055645 | A1 | 11/1999 | |
| WO | WO 2001/026457 | A2 | 4/2001 | |
| WO | WO 2006/052228 | A1 | 5/2006 | |
| WO | WO 2008/097553 | A2 | 8/2008 | |
| WO | WO2017/072482 | A1 * | 5/2017 | A01N 25/30 |
| WO | WO2017/083049 | A1 * | 5/2017 | A01N 25/02 |

OTHER PUBLICATIONS

Jayaprakasha, G. K. et al. "Identification of Volatiles from Kumquats and Their Biological Activities", Chapter 4, American Chemical Society ACS Symposium Series, 2013. (Year: 2013).*

Caring Shower Gel by Mixa Experte für Empfindliche Haut Atopiance <URL: https://www.gnpd.com/sinatra/recordpage/6373575/>, published Mar. 2019 according to Mintel GNPD. Please Note—the product can be found at <URL: https://www.amazon.de/Mixa-pflegendes-empfindliche-Neurodermitis-seifenfrei/dp/B07D6X6FHC?language=en_GB>.

Miastkowska, M.et al., 'Nanoemulsions based on selected berry seed oils'. Czasopismo Techniczne, 2016 (Chemia Zeszyt 1 Ch (4) 2016), pp. 91-100.

Written Opinion for Application No. PCT/IB2020/061197 mailed on Nov. 15, 2021.

International Search Report for Application No. PCT/IB2020/061197 mailed on Feb. 15, 2021.

International Preliminary Report on Patentability for Application No. PCT/IB2020/061197 mailed on Feb. 15, 2021.

Yagi, "Development Trend of Extraction Process and Degumming Process for Vegetable Oil Production." Oleo Science, vol. 6, No. 3, JPN6023029565, 2006, pp. 133-138, ISSN: 0005114720.

* cited by examiner

ORO 368          NIS          MSO          COC

AGRICULTURAL ADJUVANT

CROSS-REFERENCE TO RELATED APPLICATIONS

This application is a U.S. National Phase under 35 U.S.C. § 371 of International Application PCT/IB2020/061197, filed Nov. 26, 2020, designating the U.S., and published in English as WO 2021/105930 on Jun. 3, 2021, which claims priority to Great Britain Patent Application No. 1917213.9, filed Nov. 26, 2019, the entire contents of which are incorporated herein by reference.

FIELD OF DISCLOSURE

This disclosure relates to an agricultural adjuvant and use thereof, and extends to an agricultural composition.

BACKGROUND

Agricultural adjuvants are commonly used in agriculture to improve performance and/or efficacy and/or delivery of one or more active ingredients which may be added to a tank mix of agrochemicals containing said active ingredient(s), or may be applied to soil or a crop independently after application of said active ingredient(s). Typically, the active ingredient(s) may be chemically, biologically and/or physiologically active, and may for example, be at least one of, but not limited to, the following group: pesticides, insecticides, fungicides, herbicides, miticides, nematicides, plant growth regulators, defoliants, fertilizers and the like.

In cases where the active ingredient has a biochemical and/or physiological function, it is desirous that the agricultural adjuvant provides a more efficient delivery and/or provides a synergistic effect and/or is not on its own biochemically and/or physiologically active when applied to soil and/or plant matter, alternatively, that the agricultural adjuvant is not harmful to soil, seed, plant or crop. This is to avoid any biological and/or physiological side effects to the soil, seed, plant or crop, and ultimately strives to ensure food safety to end consumers. It is therefore desirous that agricultural adjuvants that improve performance and/or efficacy and/or delivery of one or more active ingredients, and not be an active ingredient in itself, alternatively, not to be harmful itself.

It is well known that certain adjuvants, surfactants, and other additives, are added to agrochemical compositions inside the same tank mix when in use. This reduces the water usage, limits compaction on soil, and reduces time associated with irrigation, fertigation and/or administration of plant protection products. However, adding adjuvants and the like into an existing tank mix of an agrochemical composition may impact upon many physico-chemical properties of the agrochemical composition, such as stability, solubility, volatility, dispersibility, viscosity, particle size, efficacy, freezing points and flash points thereof. This is important since any one or more physico-chemical properties may result in extra time, money, and water being spent on irrigation, fertigation, pest control, and application of plant protection products, not to mention the negative effects of extra compaction of the soil by agricultural vehicles.

As such, some adjuvants may be highly effective to aid and facilitate biological and/or physiological activity of active ingredients but concomitantly may have negative impacts on physico-chemical properties of agrochemical compositions rendering their use ineffective. Further, certain adjuvants may improve certain physico-chemical properties of the agricultural composition but may concomitantly worsen other physico-chemical properties.

Often, chemical agents used to improve physico-chemical properties of agrochemical compositions have negative impacts on biological and/or physiological aspects of soil and/or plant matter.

Importantly, there is a major drive to provide agrochemical compositions that are environmentally friendly, safe to use on soil and plant matter, display low phytotoxicity, and are safe for end user handling.

WO 2006/052228 discloses an adjuvant for use with herbicides, pesticides, insecticides, ovicides and fungicides generally comprising at least one surfactant and one high terpene (50% by weight or more). The surfactant assists with spreading the active ingredient when applied to a soil or a crop therein preventing accumulation of active ingredient at one site. Accumulation of active ingredient increases concentration thereof which often results in phytotoxicity which results in crop damage. However, surfactants have a tendency to foam which results in accumulation of active ingredient curbing spreading. In order to avoid foaming and to encourage spreading so-called antifoaming agents are used. These are often silicon based and not acceptable for under organic farming regulations in several jurisdictions, making them unsuitable for use. Moreover, the high terpene displays a biological function as a pesticide, insecticide, fungicide, miticide, ovicide and nematicide by coating the aforementioned and smothering same. Concomitantly, the high terpene blocks stomata of leaves therein negatively impacting photosynthesis and/or other physiological/biochemical functions. This coating function is facilitated by a high surface tension. This is undesired since an adjuvant composition should not display biological activity when applied to soil or plant matter, or should not be harmful to the plant. All the examples disclose the high terpene to be cold pressed orange oil which is known to be both very flammable and to have a very low flashpoint of about 54° C. The flashpoint is generally known as the lowest temperature at which a liquid can form an ignitable mixture in air near a surface of said liquid. The lower the flashpoint the easier the mixture and/or the surface can ignite. Moreover, the lower the flashpoint the higher the rate of evaporation which in turn decreases efficiency of agrochemical composition when in use. Low flashpoints are not desired as it creates problems not only in use in hot and dry climates, but provides manufacturing and transportation risks.

WO 2008/097553 disclosed a solution to the foaming problem described above by providing for a composition comprising a surfactant, a high terpene (50% by weight or more) being orange oil, a stabilizer, a chelating agent, a preservative, an acid pH adjuster, and an organic solvent. Although decreasing foaming and increasing spreading, the added chemistries provide for increased environmental concerns and added costs to the manufacturing process. For example, the chelating agent disclosed is ethylenediaminetetraacetic acid (EDTA) which has a particular environmental and safety risk, and there has been a drive to discontinue its use owing to its potentially damaging effects on the environment. Further, the preservative disclosed includes propyl paraben and methyl paraben which are known to negatively impact soil health conditions, as well as negatively impact on photosynthesis in plants. Further, the solvent disclosed is ethanol which is known to be a plant growth regulator (a ripening agent), therein displaying biochemical and/or physiological activity in plant matter, and therefore not sought after as being part of an agricultural adjuvant composition.

The physico-chemical impact of all the various added chemistries to the compositions disclosed in the prior art, and the already disadvantageous biological or physiological activity of the orange oil in soil and plant material, leaves many disadvantages that require amelioration for agricultural adjuvants.

In agricultural adjuvant chemistry the resulting formulation is often provided as an emulsion or a type of concentrate able to form an emulsion upon dilution. Stability of the concentrate and diluted emulsion is important. The size of molecules within the concentrate and diluted emulsion are also important. Often certain molecules within the concentrate or diluted emulsion act as carrier molecules for active ingredients such as pesticides or even for fertilizing components. The size is important to ensure proper entry and uptake into plant tissue.

There is a need for new and innovative agricultural adjuvants which are effective, and/or not biochemically and/or physiologically active on their own in soil or plant matter, and/or are environmentally friendly, and/or provide advantageous physico-chemical properties. There is further a general need to at least ameliorate the disadvantages known in the prior art. This disclosure seeks to ameliorate the disadvantages known in the art.

SUMMARY

In accordance with a first aspect of this disclosure there is provided an agricultural adjuvant comprising:

at least one polyphenol containing natural or synthetic oil composition;
  at least one anionic surfactant;
  at least one nonionic surfactant; and
  at least one pH adjuster.

The at least one polyphenol containing natural or synthetic oil composition may be a natural oil composition. The natural oil composition may be of vegetable origin. The natural oil of vegetable origin may include at least one selected from, but not limited to, the group comprising, an essential oil, an edible oil, an oil extracted from a plant, an oil extracted from a part of a plant, an oil extracted from a tree, an oil extracted from a shrub, an oil extracted from a leaf, an oil extracted from a flower, an oil extracted from a grass, an oil extracted from a plant fluid, an oil extracted from an herb, an oil extracted from a fruit, an oil extracted from a seed, a mixture of oils and combinations thereof.

The plant, or part of a plant, from which the natural oil of vegetable origin is extracted may include at least one selected from, but not limited to, the group comprising: angiosperms and/or gymnosperms.

The angiosperms may include at least one selected from, but not limited to, the group comprising: oranges, apples, grapes, peaches, grapefruit, cherries, blueberries, pomegranate, raspberries, cranberries, black elderberries, black currants, plums, blackberries, strawberries, apricots, spinach, onions, shallots, potatoes, olives, artichoke, broccoli, asparagus, carrots, cereals, wheat, rye, and oat, soybeans, black beans, white beans, chestnuts, hazelnuts, pecans, almonds, walnuts, flaxseed, coffee, tea, sesame, cocoa, capers, saffron, oregano, rosemary, cloves, peppermint, star anise, celery, sage, spearmint, thyme, basil, ginger, cumin, and cinnamon.

The gymnosperms may include at least one selected from, but not limited to, the group comprising: conifers, cycads, gingko and gnetophytes.

The agricultural adjuvant wherein the at least one polyphenol containing natural or synthetic oil composition may include at least one selected from, but not limited to, the group comprising: flavonoids including anthocyanins, chalcones, dihydrochalcones, flavanols, flavanones, flavones, flavonols, and isoflavenoids; lignans; stilbenes; and phenolic acids including hydroxybenzoic acid, hydroxycinnamic acid, hydroxyphenylacetic acid, hydroxyphenylpropanoic acid, hydroxyphenylpentanoic acid.

The agricultural adjuvant composition wherein the at least one polyphenol containing natural or synthetic oil composition may include at least one selected from, but not limited to, the group comprising: fatty acids including omega-3 fatty acid and omega-6 fatty acids; linoleic acid, terpenes, tocopherols, phytosterols, policosanols ranging from n-20:0-n-30:0 and 2-hydroxy fatty acids.

In a preferred embodiment of the disclosure the at least one polyphenol containing natural or synthetic oil composition includes black currant (*Ribes nigrum*) seed oil. The at least one polyphenol containing natural or synthetic oil composition may be only black currant (*Ribes nigrum*) seed oil to the exclusion of others. The black currant (*Ribes nigrum*) seed oil may include polyphenols including, but not limited to, anthocyanins and flavonoids. The black currant (*Ribes nigrum*) seed oil may include at least one of the following polyphenols: delphinidin-3-rutinoside, delphinidin-3-glucoside, cyanidin-3-rutinoside, cyanidin-3-glucoside, myricetin-3-rutinoside, myricetin-3-glucoside, quercetin-3-rutinoside, quercetin-3-glucoside, kaempferol-3-glucoside, dihydroquercetin, aureusidin, 1-p-coumaroyl-β-d-glucopyranoside, 1-cinnamoyl-β-d-glucopyranoside, caffeic acid, ferulic acid, p-coumaric acid, gallic acid, protocatechuic acid and p-hydroxybenzoic acid.

In certain embodiments the at least one polyphenol containing natural or synthetic oil composition further includes flavonoids belonging to one of two classes: the anthocyanin class or the proanthocyanidin class, for example, but not limited to: delphinidine-3-glucoside, delphinidine-3-rutinoside, cyanidine-3-glucoside, and cyanidine-3-rutinoside, high-molecular-weight galactans.

The at least one anionic surfactant may include at least one selected from, but not limited to, the group comprising: ($C_6$-$C_{18}$) alkyl benzene sulfonic acid, calcium dodecylbenzene sulfonate, sodium dodecylbenzene sulfonate, amine ($C_6$-$C_{18}$) alkyl benzene sulfonate, triethanolamine dodecylbenzene sulfonates, ($C_6$-$C_{18}$) alkyl ether sulfates, ($C_6$-$C_{18}$) alkyl ethoxylated ether sulfates, ($C_6$-$C_{18}$) alkyl sulfates, lauryl ether polyethoxylated sodium sulfate, ($C_6$-$C_{18}$) alkyl phosphate esters, ($C_6$-$C_{18}$) alkoxylated sulfates, ($C_6$-$C_{18}$) alkoxylated phosphate esters, xylene sulfonate salts, cumene sulfonate salts, lactic acid-based anionic surfactants and combinations thereof.

In a preferred embodiment of the disclosure the at least one anionic surfactant comprises dodecylbenzene sulfonic acid and/or sodium laurel ether sulphate (SLES).

The at least one nonionic surfactant may include at least one selected from, but not limited to, the group comprising: natural and/or synthetic ($C_8$-$C_{22}$) alkoxylated fatty alcohols, ($C_8$-$C_{22}$) ethoxylated fatty alcohols, ($C_8$-$C_{22}$) propoxylated fatty alcohols, ($C_8$-$C_{22}$) ethoxylated and propoxylated fatty alcohols, straight chain ($C_4$-$C_{10}$) alkyl(poly)glycosides, branched chain ($C_4$-$C_{10}$) alkyl(poly)glycosides; and alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof.

The ethoxylated fatty alcohols of fatty acids may have a degree of ethoxylation of from 1 to 50, more preferably 2 to 30, most preferably 3 to 10.

Some alkoxylated alcohols contemplated for use include those based on branched alcohols, such as the Guerbet alcohols, e.g. 2-propylheptanol and 2-ethylhexanol, and $C_{10}$-OXO-alcohol or $C_{13}$ OXO-alcohol, i.e. an alcohol mixture whose main component is formed by at least one branched $C_{10}$-alcohol or $C_{13}$-alcohol, and the alcohols commercially available as Exxal alcohols from Exxon Mobile Chemicals and Neodol alcohols from Shell Chemicals.

In a preferred embodiment of the disclosure the non-ionic surfactant comprises secondary alcohol ($C_{11}$-$C_{15}$) ethoxylates.

The pH adjuster may include a basic and/or an acid compound. The pH adjuster may include gluconic acid, barium carbonate, calcium chlorate, chlorous acid, sodium salt, sodium hydroxide, hydrobromic acid, tricalcium citrate.

In a preferred embodiment of this disclosure the pH adjuster may include sodium hydroxide and/or citric acid monohydrate. The pH adjuster allows for the adjuvant when in use to be stable across a wide range and provides an adjuvant having a buffered pH of from about pH 4 to about pH 8.

The agricultural adjuvant may further comprise a diluent, typically water.

The agricultural adjuvant may further comprise an additive and may include at least one selected from, but not limited to, the group comprising: preservatives, clarifiers, anti-freezing agents, hydrotropes, stabilizers, antioxidants, acidifiers, chelates, complexing agents, dyes, rheology modifiers, antifoams, anti-drift and solvents, and combinations thereof.

The antioxidant may include at least one selected from, but not limited to, the group comprising: butyl hydroxy toluene, 3,5-bis(1,1-dimethylethyl)-4-hydroxy-, octadecyl ester, phenol, 2,4-bis(1,1-dimethylethyl)-, 1,1',1"-phosphite.

The stabilizer may include at least one selected from, but not limited to, the group comprising: urea, polyvinyl alcohols, polyvinyl pyrrolidone, methylcelluloses, hydroxyethyl- and propylcelluloses, and also sodium carboxymethylcellulose, gelatin, casein, starch, gum arabic, hydroxy ethyl starch and sodium alginate.

The preservative may include at least one selected from, but not limited to, the group comprising the following group: 2-phenoxy ethanol and 1,2-benzisothiazolin-3-one.

The agricultural adjuvant of the first aspect of this disclosure may further include at least one of, but not limited to, the following group: insecticides, fungicides, herbicides, desiccants, defoliants, acaricides, nutrients, miticides, bactericides, biocides, ovicides, nematicides, insect growth regulators, plant growth regulators, fertilizers and combinations thereof.

The agricultural adjuvant of the first aspect of the invention may further include an essential oil and may be kumquat (*Citrus japonica*) oil. Kumquat oil may comprise at least one of, but not limited to, the following group: limonene (preferably d-limonene), alpha-pinene, bergamotene, caryophyllene, α-humulene, α-muurolene, isopropyl propanoate, terpinyl acetate, carvone, citronellal, 2-methylundecanal, nerol and trans-linalool oxide.

The agricultural adjuvant of the first aspect of the disclosure may be formulated as a concentrate form (despite including a wt. % of water diluent). The concentrate form of the agricultural adjuvant of the first aspect of the disclosure may be further diluted providing a diluted form prior to application and/or use on or to soil, seed, plant or crop. The diluted form is typically present in a tank mix prior to application in use.

In an example embodiment of the disclosure there is provided an agricultural adjuvant comprising:

at least one polyphenol containing natural or synthetic oil composition present in an amount of between about 1 wt. % to about 20 wt. % or any value therebetween;

at least one anionic surfactant present in an amount of between about 2 wt. % to about 60 wt. % or any value therebetween;

at least one nonionic surfactant present in an amount of between about 2 wt. % to about 20 wt. % or any value therebetween; and at least one pH adjuster present in an amount of between about 1 wt. % to about 10 wt. % or any value therebetween, wherein the wt. % is a total for the adjuvant.

The example embodiment of the disclosure may further comprise water as a diluent and/or other additives of about 2 wt. % to about 80 wt. % (or any value therebetween) of the water and/or other additives. This embodiment may still provide the liquid agricultural adjuvant in concentrate form. All ranges presented in this disclosure include the minimum and the maximum presented in said range and includes any value between the minimum and maximum.

In a further example embodiment of the disclosure there is provided an agricultural adjuvant comprising:

at least one polyphenol containing natural or synthetic oil composition present in an amount of between about 1 wt. % to about 20 wt. %, preferably between about 2 wt. % and about 10 wt. %;

at least one anionic surfactant present in an amount of between about 2 wt. % to about 60 wt. %, preferably between about 10 wt. % to about 50 wt. %;

at least one nonionic surfactant present in an amount of between about 2 wt. % to about 20 wt. %, preferably between about 5% wt. % and about 10 wt. %; and at least one pH adjuster present in an amount of between about 1 wt. % to about 10 wt. %, preferably between about 1 wt. % and about 5 wt. %, wherein the wt. % is a total for the adjuvant;

wherein the at least one polyphenol containing natural or synthetic oil composition may be a natural oil composition of vegetable origin selected from, but not limited to, the group comprising: oranges, apples, grapes, peaches, grapefruit, cherries, blueberries, pomegranate, raspberries, cranberries, black elderberries, black currants, plums, blackberries, strawberries, apricots, spinach, onions, shallots, potatoes, olives, artichoke, broccoli, asparagus, carrots, cereals, wheat, rye, and oat, soybeans, black beans, white beans, chestnuts, hazelnuts, pecans, almonds, walnuts, flaxseed, coffee, tea, sesame, cocoa, capers, saffron, oregano, rosemary, cloves, peppermint, star anise, celery, sage, spearmint, thyme, basil, ginger, cumin, cinnamon, conifers, cycads, gingko and gnetophytes, preferably a natural oil composition of vegetable origin from black currant (*Ribes nigrum*) seed oil wherein the at least one anionic surfactant may be selected from, but not limited to, the group comprising: ($C_6$-$C_{18}$) alkyl benzene sulfonic acid salts, calcium dodecylbenzene sulfonate, sodium dodecylbenzene sulfonate, amine ($C_6$-$C_{18}$) alkyl benzene sulfonate, triethanolamine dodecylbenzene sulfonates, ($C_6$-$C_{18}$) alkyl ether sulfates, ($C_6$-$C_{18}$) alkyl ethoxylated ether sulfates, ($C_6$-$C_{18}$) alkyl sulfates, lauryl ether polyethoxylated sodium sulfate, $(C_6-C_{18})$ alkyl phosphate esters, $(C_6-C_{18})$ alkoxylated sulfates, $(C_6-C_{18})$ alkoxylated phosphate esters, xylene sulfonate salts, cumene sulfonate salts, and combinations thereof, preferably the at least one anionic surfactant comprises dodecylbenzene sulfonic acid and/or sodium laurel ether sulphate (SLES); and wherein the at least one nonionic surfactant may be selected from, but not limited to, the group comprising: $(C_8-C_{22})$ alkoxylated fatty alcohols, $(C_8-C_{22})$ ethoxylated fatty alcohols, $(C_8-C_{22})$ propoxylated fatty alcohols, $(C_8-C_{22})$ ethoxylated and propoxylated fatty alcohols, straight chain $(C_4-C_{10})$ alkyl (poly)glycosides, branched chain $(C_4-C_{10})$ alkyl(poly)glycosides; and alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof, preferably the non-ionic surfactant comprises secondary alcohol $(C_{11}-C_{15})$ ethoxylates; and wherein the pH adjuster may include sodium hydroxide and/or citric acid monohydrate.

The example embodiment of the disclosure may further comprise water as a diluent and/or other additives of about 2 wt. % to about 80 wt. % (or any value therebetween) of the water and/or other additives. This embodiment may still provide the liquid agricultural adjuvant in concentrate form.

The example embodiment of the disclosure may further comprise kumquat (*Citrus japonica*) oil. The kumquat (*Citrus japonica*) oil may comprise between about 0.05 wt. % to about 5 wt. %, preferably between about 0.5 wt. % to about 3 wt. %, further preferably between about 0.8 wt. % to about 2 wt. %.

The agricultural adjuvant may be formulated and/or adapted to provide a spray composition for application to soil and/or plants in agriculture.

The Applicant has surprisingly found that the agricultural adjuvant according to the first aspect of this disclosure provides for a physico-chemically stable and homogenous concentrate form which, when diluted, provides a stable diluted emulsion or micro-emulsion or nano emulsions. The agricultural adjuvant displays a flashpoint of greater than about 100° C. providing a safe adjuvant in both concentrate and dilute forms. Surprisingly the agricultural adjuvant shows little foaming in use, and better spreading, wetting and penetration characteristics in use compared to a commercially available equivalent. Without being limited to theory, the Applicant submits that it is the unique combination of essential features comprising the agricultural adjuvant that assists in ameliorating the disadvantages of the prior art. Further the claimed wt. % of the various different essential features as a portion of the total wt. % of the agricultural adjuvant may further facilitate imparting the advantages shown here below.

A skilled person in the art would not have considered an agricultural adjuvant including at least one polyphenol containing natural or synthetic oil composition since prior art natural oils provide for low flashpoints and have been shown to be harmful to plants and/or biochemically or physiologically active. Without being limited to theory, the Applicant believes that the unique chemical composition of the at least one polyphenol containing natural or synthetic oil composition provides means to overcome the disadvantages seen in the prior art. Further, the unique chemical composition of the at least one polyphenol containing natural or synthetic oil composition together with the remaining essential elements further assists in overcoming the prior art disadvantages.

The Applicant has surprisingly found that the agricultural adjuvant according to the first aspect of the disclosure protects active ingredients from damage by ultraviolet (UV) radiation. This facilitates providing plant and/or soil material with a greater quantity of active ingredient in regions that might experience or receive above average UV radiation. This further facilitates using less active ingredient to achieve a similar or same result.

The Applicant has surprisingly found that the agricultural adjuvant according to the first disclosure is more effective when compared to commercial prior art adjuvant. Increasing efficacy allows less active ingredient to be utilized whilst not compromising end results, and in turn, hinders biological resistance to active ingredients. Hindering and/or preventing resistance of active ingredients including at least one of pesticides, insecticides, fungicides, herbicides, miticides, nematicides, plant growth regulators, defoliants, fertilizers, is tremendously advantageous in commercial farming operations.

The Applicant has also surprisingly and unexpected found that a preferred embodiment of the disclosure provides uniquely smaller sized molecules within a resulting concentrated or diluted form, both typically providing a stable emulsion.

In accordance with a second aspect of this disclosure there is provided a method for manufacturing an agricultural adjuvant as described in the first aspect of this disclosure, the method comprising the following steps:

(i). adding at least one polyphenol containing natural or synthetic oil composition into a mixing vessel;

(ii). adding at least one anionic surfactant to the mixing vessel;

(iii). adding at least one nonionic surfactant to the mixing vessel; and (iv). adding at least one pH adjuster to the mixing vessel, wherein steps (i) to (iv) conducted in any order provides for the concentrate form of the agricultural adjuvant.

The at least one polyphenol containing natural or synthetic oil composition, the at least one anionic surfactant, the at least one nonionic surfactant, and the at least one pH adjuster may as described in the first aspect of this disclosure above.

The method may further include the step of introducing a diluent, typically water.

The method may further include the step of introducing an additive and may include at least one selected from, but not limited to, the group comprising: preservatives, clarifiers, anti-freezing agents, hydrotropes, stabilizers, antioxidants, acidifiers, chelates, complexing agents, dyes, rheology modifiers, antifoams, anti-drift and solvents, and combinations thereof.

The method may further include the step of introducing at least one of, but not limited to, the following group: insecticides, fungicides, herbicides, desiccants, defoliants, acaricides, nutrients, miticides, bactericides, biocides, ovicides, nematicides, insect growth regulators, plant growth regulators, fertilizers and combinations thereof. Preferably, this step provides for a spray composition for application to plants and/or soil in agriculture. The method may further include any other component disclosed in the first aspect of the disclosure above.

The method according to this second aspect of the disclosure provides a concentrate form (despite including a wt.

% of water diluent). The concentrate form of the agricultural adjuvant of the first aspect of the disclosure may be further diluted prior to application and/or use on or to soil, seed, plant or crop.

In accordance with a third aspect of this disclosure there is provided a method of diluting the agricultural adjuvant described in the first aspect of this disclosure, the method comprising:

diluting the adjuvant concentrate prepared according as described in the first aspect of the disclosure above with water at a ratio by weight of liquid agricultural adjuvant to water 1:5000 to 1:10 to yield a stable diluted emulsion and/or microemulsion and/or nano emulsion. It is to be understood that the water may further contain at least one agricultural compound selected from, but not limited to, the group comprising: insecticides, fungicides, herbicides, desiccants, defoliants, acaricides, nutrients, miticides, bactericides, biocides, ovicides, nematicides, insect growth regulators, plant growth regulators, and combinations thereof.

The method wherein the liquid agricultural adjuvant may be diluted in a at least one of, but not limited to, the following group: a mixing tank, a spray tank, a container, or an inline irrigation system, therein providing the diluted liquid agricultural adjuvant which may be a stable diluted emulsion or microemulsion or nano emulsions that facilitates rain-fastness through accelerated uptake into the plant owing to for example wax dissolution capability of the adjuvant.

The method wherein the stable diluted emulsion and/or microemulsion and/or nano emulsions may be applied on at least one member of, but not limited to, the group comprising: plants, weeds, seeds, soil, urban places, and forests, via an apparatus selected from, but not limited to, the group comprising: air assisted sprayers, conventional sprayers, ultra-low volumes equipment such as aerial, electrostatic, foggers and misting spray equipment and chemigation systems, pivots, sprinklers, and combinations thereof. The disclosure extends to uses of the agricultural adjuvant.

In accordance with a fourth aspect of this disclosure there is provided use of the agricultural adjuvant described in the first aspect of this disclosure in agriculture, said use comprising the steps of:

(i) combining the agricultural adjuvant of the first aspect together with water to provide a dilute form and at least one agricultural compound selected from, but not limited to, the group comprising: insecticides, fungicides, herbicides, desiccants, defoliants, acaricides, nutrients, miticides, bactericides, biocides, ovicides, nematicides, insect growth regulators, plant growth regulators, and combinations thereof, to provide a mixture; and (ii) applying the mixture to plants, weeds, seeds, soil, urban places, and forests, via an apparatus selected from, but not limited to, the group comprising: air assisted sprayers, conventional sprayers, ultra-low volumes equipment such as aerial, electrostatic, foggers and misting spray equipment and chemigation systems, pivots, sprinklers, and combinations thereof.

In accordance with a fifth aspect of this disclosure there is provided an agricultural composition comprising:

at least one polyphenol containing natural or synthetic oil composition;

at least one anionic surfactant;

at least one nonionic surfactant; and at least one pH adjuster.

The at least one polyphenol containing natural or synthetic oil composition may be as described in the first to third aspects of the disclosure above.

The at least one anionic surfactant may be as described in the first to third aspects of the disclosure above.

The at least one nonionic surfactant may be as described in the first to third aspects of the disclosure above.

The at least one nonionic surfactant may be as described in the first to third aspects of the disclosure above.

The at least one pH adjuster may be as described in the first to third aspects of the disclosure above.

The at least one nonionic surfactant may be as described in the first to third aspects of the disclosure above.

The agricultural composition of the fifth aspect of this disclosure may further include at least one of, but not limited to, the following group: insecticides, fungicides, herbicides, desiccants, defoliants, acaricides, nutrients, miticides, bactericides, biocides, ovicides, nematicides, insect growth regulators, plant growth regulators, fertilizers and combinations thereof.

The agricultural adjuvant of the fifth aspect of the invention may further include an essential oil and may be kumquat (*Citrus japonica*) oil. Kumquat oil may comprise at least one of, but not limited to, the following group: limonene (preferably d-limonene), alpha-pinene, bergamotene, caryophyl-lene, α-humulene, α-muurolene, isopropyl propanoate, ter-pinyl acetate, carvone, citronellal, 2-methylundecanal, nerol and trans-linalool oxide.

The agricultural composition according to the fifth aspect of the invention may be formulated with additional chem-istries and/or a diluent. The agricultural composition may provide a tank mix partner providing in use a stable tank mix. The agricultural composition may provide an in-can formulation partner providing in use a stable in-can formu-lation. Stability is an important property to ensure effective use and/or application of the agricultural formulation to plant, soil and/or seed material.

The agricultural composition according to the fifth aspect of the invention may be formulated and/or provided as a pesticide.

The agricultural composition may be provided as a tank mix and/or as an in-can formulation. Tank mixes may include multicomponent chemical-compositions mixed inside a tank from which irrigation and/or fertigation will take place. In-can formulations include multicomponent chemical-compositions within a single can (or container), wherein individual components may have different chemical properties when in use and wherein the single can (or container) may be sold as a stand alone item including therein the different multi-components.

The Applicant believes that the subject matter of the disclosure described herein at least ameliorates one of the disadvantages known in the current state of the art.

While the subject matter of the disclosure has been described in detail with respect to specific embodiments and/or examples thereof, it will be appreciated that those skilled in the art, upon attaining an understanding of the foregoing may readily conceive of alterations to, variations of and equivalents to these embodiments. Accordingly, the scope of the present disclosure should be assessed as that of the claims and any equivalents thereto, which claims are appended hereto.

BRIEF DESCRIPTION OF THE FIGURES

Embodiments of the disclosure will be described below by way of example only and with reference to the accompanying drawings in which.

DETAILED DESCRIPTION OF PREFERRED EMBODIMENTS OF THE DISCLOSURE

Figure 1:
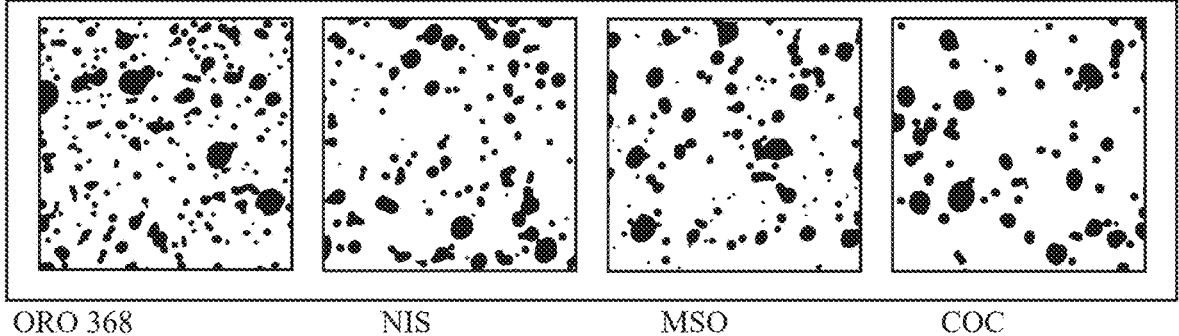
FIG. 1 shows spreading properties of the adjuvant according to this disclosure ORO-368 compared to known adjuvants such as COC, MSO and NIS.

The content of the Summary above is fully repeated herein by way of reference and to avoid unnecessary repetition. However, non-limiting aspects of the disclosure are provided here to include an agricultural adjuvant and/or agricultural composition, a method for manufacturing the aforementioned, and its use are described herein.

Providing safe and effective adjuvants having low flash-points, exhibiting stability in a concentrate and dilute form, not being harmful to soil, seed, or plant matter (or additionally and/or alternatively not being biochemically and/or physiologically active) remains a challenging endeavor. Further, providing adjuvants that in use are effectively retained onto plant matter and provide in use effective spreading and/or wetting and/or penetration characteristics remains a challenging endeavor. Slight variations to adjuvant formulations may have major disadvantageous impacts on the physico-chemical properties thereof and may make same wholly unsuitable for use in agriculture. Further, providing agricultural adjuvants that provide molecules with particle sizes that are small enough to ensure efficient uptake into and through a plant whilst is another challenge.

Typically, agricultural adjuvants are tank mixed and sprayed onto a plant surface. High efficiency spray retention of the adjuvant onto the plant surface is required for maximizing delivery of active ingredients in agrochemicals including active ingredients present in insecticides, fungicides, herbicides, desiccants, defoliants, acaricides, nutrients, miticides, bactericides, biocides, ovicides, nematicides, insect growth regulators, plant growth regulators, fertilizers and/or crop protection agrochemicals and combinations thereof.

Increasing the retention of adjuvant on a plant/seed/soil surface increases the amount of active ingredient potentially available for reaching a biological site of action. Retention may be understood as the overall capture of spray droplets by a plant and determines the amount of active ingredient on a plant and therefore possibly available to the plant. Retention is dependent on a complex interfacial interaction of adjuvant spray droplets and the plant surface itself. Factors considered to be important for adjuvant spray liquid adhesion and retention include: (i) physico-chemical properties of the agricultural adjuvant concentrate form and therefore also its diluted form sprayed as a solution from a tank mix; (ii) diameter spectra and impaction velocity of adjuvant spray droplets; and (iii) characteristics of plant surface, shape and orientation of the target leaves and density of plant canopy.

For plants, wettability of the leaf surface is typically governed by surface roughness caused by different microstructures (for example trichomes, cuticular folds and wax crystals), together with the hydrophobic properties of the epicuticular wax. Hydrophobicity of epicuticular wax and the microstructures can efficiently reduce the deposition and retention of adjuvant spray droplets by increasing contact angles and reducing contact area with plant leaf surface.

The physico-chemical properties, which are complex, of the adjuvant is the most important factor determining the outcome of the interaction between plant surface and spray solutions. Consequently, the different chemical components and their interactions together as part of an agricultural adjuvant are important considerations. Predicting physico-chemical properties of an agricultural adjuvant from its various chemical components is not readily possible. Further, predicting physiological and/or biochemical interactions is a near impossibility.

There is a need for new and innovative agricultural adjuvants which are effective, not biochemically and/or physiologically active on their own in soil or plant matter (or are not harmful to plants), are environmentally friendly, and provide advantageous physico-chemical properties. There is further a general need to at least ameliorate the disadvantages known in the prior art.

To at least ameliorate the disadvantage of the prior art, and in accordance with a first aspect of this disclosure there is provided an agricultural adjuvant.

The agricultural adjuvant comprises at least one polyphenol containing natural or synthetic oil composition, at least one anionic surfactant, at least one nonionic surfactant, and at least one pH adjuster. Without being limited to theory, the Applicant believes that the unique chemical composition of the at least one polyphenol containing natural or synthetic oil composition provides means to overcome the disadvantages seen in the prior art. Further, the unique chemical composition of the at least one polyphenol containing natural or synthetic oil composition together with the remaining essential elements further assists in overcoming the prior art disadvantages.

The at least one polyphenol containing natural or synthetic oil composition may be a natural oil composition, preferably the natural oil composition may be of vegetable origin. The natural oil of vegetable origin may include at least one selected from, but not limited to, the group comprising, an essential oil, an edible oil, an oil extracted from a plant, an oil extracted from a part of a plant, an oil extracted from a tree, an oil extracted from a shrub, an oil extracted from a leaf, an oil extracted from a flower, an oil extracted from a grass, an oil extracted from a plant fluid, an oil extracted from an herb, an oil extracted from a fruit, an oil extracted from a seed, a mixture of oils and combinations thereof.

The plant, or part of a plant, from which the natural oil of vegetable origin is extracted may include at least one selected from, but not limited to, the group comprising: angiosperms and/or gymnosperms. The angiosperms may include at least one selected from, but not limited to, the group comprising: oranges, apples, grapes, peaches, grapefruit, cherries, blueberries, pomegranate, raspberries, cranberries, black elderberries, black currants, plums, blackberries, strawberries, apricots, spinach, onions, shallots, potatoes, olives, artichoke, broccoli, asparagus, carrots, cereals, wheat, rye, and oat, soybeans, black beans, white beans, chestnuts, hazelnuts, pecans, almonds, walnuts, flaxseed, coffee, tea, sesame, cocoa, capers, saffron, oregano, rosemary, cloves, peppermint, star anise, celery, sage, spearmint, thyme, basil, ginger, cumin, and cinnamon. The gymnosperms may include at least one selected from, but not limited to, the group comprising: conifers, cycads, gingko and gnetophytes.

The agricultural adjuvant wherein the at least one polyphenol containing natural or synthetic oil composition may include at least one selected from, but not limited to, the group comprising: flavonoids including anthocyanins, chalcones, dihydrochalcones, flavanols, flavanones, flavones, flavonols, and isoflavanoids; lignans; stilbenes; and phenolic acids including hydroxybenzoic acid, hydroxycinnamic acid, hydroxyphenylacetic acid, hydroxyphenylpropanoic acid, hydroxyphenylpentanoic acid.

The agricultural adjuvant composition wherein the at least one polyphenol containing natural or synthetic oil composition may include at least one selected from, but not limited to, the group comprising: fatty acids including omega-3 fatty acid and omega-6 fatty acids; linoleic acid, terpenes, tocopherols, phytosterols, policosanols ranging from n-20:0-n-30:0 and 2-hydroxy fatty acids.

In a preferred embodiment of the disclosure the at least one polyphenol containing natural or synthetic oil composition includes black currant (*Ribes nigrum*) seed oil, and/or may include black currant (*Ribes nigrum*) seed oil to the exclusion of others. The black currant (*Ribes nigrum*) seed oil may include polyphenols including, but not limited to, anthocyanins and flavonoids. The black currant (*Ribes nigrum*) seed oil may include at least one of the following polyphenols: delphinidin-3-rutinoside, delphinidin-3-glucoside, cyanidin-3-rutinoside, cyanidin-3-glucoside, myricetin-3-rutinoside, myricetin-3-glucoside, quercetin-3-rutinoside, quercetin-3-glucoside, kaempferol-3-glucoside, dihydroquercetin, aureusidin, 1-p-coumaroyl-β-d-glucopyranoside, 1-cinnamoyl-β-d-glucopyranoside, caffeic acid, ferulic acid, p-coumaric acid, gallic acid, protocatechuic acid and p-hydroxybenzoic acid.

In certain embodiments the at least one polyphenol containing natural or synthetic oil composition includes flavonoids belong to one of two classes: the anthocyanin class or the proanthocyanidin class, for example, but not limited to: delphinidine-3-glucoside, delphinidine-3-rutinoside, cyanidine-3-glucoside, and cyanidine-3-rutinoside, high-molecular-weight galactans.

The at least one anionic surfactant may include at least one selected from, but not limited to, the group comprising: $(C_6\text{-}C_{18})$ alkyl benzene sulfonic acid, calcium dodecylbenzene sulfonate, sodium dodecylbenzene sulfonate, amine $(C_6\text{-}C_{18})$ alkyl benzene sulfonate, triethanolamine dodecylbenzene sulfonates, $(C_6\text{-}C_{18})$ alkyl ether sulfates, $(C_6\text{-}C_{18})$ alkyl ethoxylated ether sulfates, $(C_6\text{-}C_{18})$ alkyl sulfates, lauryl ether polyethoxylated sodium sulfate, $(C_6\text{-}C_{18})$ alkyl phosphate esters, $(C_6\text{-}C_{18})$ alkoxylated sulfates, $(C_6\text{-}C_{18})$ alkoxylated phosphate esters, xylene sulfonate salts, cumene sulfonate salts, and combinations thereof. In a preferred embodiment of the disclosure the at least one anionic surfactant comprises dodecylbenzene sulfonic acid and/or sodium laurel ether sulphate (SLES).

The at least one nonionic surfactant may include at least one selected from, but not limited to, the group comprising: natural and/or synthetic $(C_8\text{-}C_{22})$ alkoxylated fatty alcohols, $(C_8\text{-}C_{22})$ ethoxylated fatty alcohols, $(C_8\text{-}C_{22})$ propoxylated fatty alcohols, $(C_8\text{-}C_{22})$ ethoxylated and propoxylated fatty alcohols, straight chain $(C_4\text{-}C_{10})$ alkyl(poly)glycosides, branched chain $(C_4\text{-}C_{10})$ alkyl(poly)glycosides; and alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof. In a preferred embodiment of the disclosure the non-ionic surfactant comprises secondary alcohol $(C_{11}\text{-}C_{15})$ ethoxylates.

The pH adjuster may include a basic and/or an acid compound. In a preferred embodiment of this disclosure the pH adjuster may include sodium hydroxide and/or citric acid monohydrate. The pH adjuster provides for an agricultural adjuvant which does not precipitate out of solution in its concentrate form, and provides for a pH buffered range when the adjuvant is diluted in a tank mix prior to application. Different soils and/or plants require a different pH for optimal delivery of an active ingredient. Further different active ingredients require different pH values for effective delivery or to prevent unwanted chemical side reactions which would render the active ingredient useful. Providing a pH buffered range between about pH 4 and about pH 8 from a single adjuvant allows great flexibility in use. The buffered pH range also allows the agricultural adjuvant to be compatible with a host of different agrochemicals when in use.

The agricultural adjuvant may further comprise a diluent, typically water. The agricultural adjuvant may further comprise an additive and may include at least one selected from, but not limited to, the group comprising: preservatives, clarifiers, anti-freezing agents, hydrotropes, stabilizers, antioxidants, acidifiers, chelates, complexing agents, dyes, rheology modifiers, antifoams, anti-drift and solvents, and combinations thereof. The example embodiment of the disclosure may further comprise water as a diluent and/or other additives of about 2 wt. % to about 80 wt. % (or any value therebetween) of the water and/or other additives. This embodiment may still provide the liquid agricultural adjuvant in concentrate form. All ranges presented in this disclosure include the minimum and the maximum presented in said range and includes any value between the minimum and maximum.

The anti-oxidant is typically butyl hydroxy toluene. The stabilizer is typically urea. The preservative is typically 2-phenoxy ethanol and 1,2-benzisothiazolin-3-one.

The agricultural adjuvant of the first aspect of this disclosure may further include at least one of, but not limited to, the following group: insecticides, fungicides, herbicides, desiccants, defoliants, acaricides, nutrients, miticides, bactericides, biocides, ovicides, nematicides, insect growth regulators, plant growth regulators, fertilizers and combinations thereof.

The agricultural adjuvant of the fifth aspect of the invention may further include an essential oil and may be kumquat (*Citrus japonica*) oil. Kumquat oil may comprise at least one of, but not limited to, the following group: limonene (preferably d-limonene), alpha-pinene, bergamotene, caryophyllene, α-humulene, α-muurolene, isopropyl propanoate, terpinyl acetate, carvone, citronellal, 2-methylundecanal, nerol and trans-linalool oxide.

The agricultural adjuvant of the first aspect of the disclosure may be formulated as a concentrate form (despite including a wt. % of water diluent). The concentrate form of the agricultural adjuvant of the first aspect of the disclosure may be further diluted prior to application and/or use on or to soil, seed, plant or crop. Both the concentrate form and diluted form may provide a stable emulsion.

In a further example embodiment of the disclosure there is provided an agricultural adjuvant comprising:

at least one polyphenol containing natural or synthetic oil composition present in an amount of between about 1 wt. % to about 20 wt. %, preferably between about 2 wt. % and about 10 wt. %, further preferably between about 5 wt. % and about 8 wt. %;

at least one anionic surfactant present in an amount of between about 2 wt. % to about 60 wt. %, preferably between about 10 wt. % to about 50 wt. %, further preferably between about 20 wt. % and about 30 wt. %;

at least one nonionic surfactant present in an amount of between about 2 wt. % to about 20 wt. %, preferably between about 5 wt. % and about 10 wt. %, further preferably between about 7 wt. % and about 8 wt. %; and at least one pH adjuster present in an amount of between about 1 wt. % to about 10 wt. %, preferably between about 1 wt. % and about 5 wt. %, further preferably between about 1 wt. % and about 2 wt. %;

wherein the wt. % is a total for the adjuvant; and wherein the at least one polyphenol containing natural or synthetic oil composition may be a natural oil composition of vegetable origin selected from, but not limited to, the group comprising: oranges, apples, grapes, peaches, grapefruit, cherries, blueberries, pomegranate, raspberries, cranberries, black elderberries, black currants, plums, blackberries, strawberries, apricots, spinach, onions, shallots, potatoes, olives, artichoke, broccoli, asparagus, carrots, cereals, wheat, rye, and oat, soybeans, black beans, white beans, chestnuts, hazelnuts, pecans, almonds, walnuts, flaxseed, coffee, tea, sesame, cocoa, capers, saffron, oregano, rosemary, cloves, peppermint, star anise, celery, sage, spearmint, thyme, basil, ginger, cumin, cinnamon, conifers, cycads, gingko and gnetophytes, preferably black currant (*Ribes nigrum*) seed oil;

wherein the at least one anionic surfactant may be selected from, but not limited to, the group comprising: $(C_6\text{-}C_{18})$ alkyl benzene sulfonic acid salts, calcium dodecylbenzene sulfonate, sodium dodecylbenzene sulfonate, amine $(C_6\text{-}C_{18})$ alkyl benzene sulfonate, triethanolamine dodecylbenzene sulfonates, $(C_6\text{-}C_{18})$ alkyl ether sulfates, $(C_6\text{-}C_{18})$ alkyl ethoxylated ether sulfates, $(C_6\text{-}C_{18})$ alkyl sulfates, lauryl ether polyethoxylated sodium sulfate, $(C_6\text{-}C_{18})$ alkyl phosphate esters, $(C_6\text{-}C_{18})$ alkoxylated sulfates, $(C_6\text{-}C_{18})$ alkoxylated phosphate esters, xylene sulfonate salts, cumene sulfonate salts, and combinations thereof, preferably the at least one anionic surfactant comprises dodecylbenzene sulfonic acid and/or sodium laurel ether sulphate (SLES); and wherein the at least one nonionic surfactant may be selected from, but not limited to, the group comprising: $(C_8\text{-}C_{22})$ alkoxylated fatty alcohols, $(C_8\text{-}C_{22})$ ethoxylated fatty alcohols, $(C_8\text{-}C_{22})$ propoxylated fatty alcohols, $(C_8\text{-}C_{22})$ ethoxylated and propoxylated fatty alcohols, straight chain $(C_4\text{-}C_{10})$ alkyl (poly)glycosides, branched chain $(C_4\text{-}C_{10})$ alkyl(poly)glycosides; and alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof, preferably the non-ionic surfactant comprises secondary alcohol $(C_{11}\text{-}C_{15})$ ethoxylates; and wherein the pH adjuster may include sodium hydroxide and/or citric acid monohydrate.

The example embodiment of the disclosure may further comprise water as a diluent and/or other additives of about 2 wt. % to about 80 wt. % (or any value therebetween) of the water and/or other additives. This embodiment may still provide the liquid agricultural adjuvant in concentrate form.

In a further example embodiment the disclosure may further comprise kumquat (*Citrus japonica*) oil. The kumquat (*Citrus japonica*) oil may comprise between about 0.05 wt. % to about 5 wt. %, preferably between about 0.5 wt. % to about 3 wt. %, further preferably between about 0.8 wt. % to about 2 wt. %.

The Applicant has surprisingly found that the agricultural adjuvant according to the first aspect of the disclosure protects active ingredients from damage by ultraviolet (UV) radiation. This facilitates providing plant and/or soil material with a greater quantity of active ingredient in regions that might experience or receive above average UV radiation. This further facilitates using less active ingredient to achieve a similar or same result.

The Applicant has surprisingly found that the agricultural adjuvant according to the first disclosure is more effective when compared to commercial prior art adjuvant. Increasing efficacy allows less active ingredient to be utilized in a tank mix whilst not compromising end results, and in turn, hinders biological resistance to active ingredients. Hindering and/or preventing resistance of active ingredients including at least one of pesticides, insecticides, fungicides, herbicides, miticides, nematicides, plant growth regulators, defoliants, fertilizers, is tremendously advantageous in commercial farming operations.

In accordance with a second aspect of this disclosure there is provided a method for manufacturing an agricultural adjuvant as described in the first aspect of this disclosure, the method comprising the following steps:

(i). adding at least one polyphenol containing natural or synthetic oil composition into a mixing vessel;

(ii). adding at least one anionic surfactant to the mixing vessel;

(iii). adding at least one nonionic surfactant to the mixing vessel; and (iv). adding at least one pH adjuster to the mixing vessel, wherein steps (i) to (iv) conducted in any order provides for the concentrate form of the agricultural adjuvant. It is to be understood that the sequence of steps (i) to (iv) may vary. The method for manufacturing the agricultural adjuvant is simple and scalable. Upscaling is often complicated by individual chemical components of an agricultural adjuvant. Arriving at a particular agricultural adjuvant that not only effectively functions as an adjuvant whilst not harming plants, but is also can be upscaled for commercial production is a major advantage. Adding to this advantage is the high (greater than about 100° C.) flashpoint of the agricultural adjuvant of the first aspect. Prior art adjuvants having natural or essential oils have previously been found to have low flashpoints making the manufacture, handling and use dangerous. A higher flashpoint makes the commercial manufacture significantly safer. A higher flashpoint further provides for less evaporation of active ingredient providing an increased period of time for the active ingredient to reach its intended target in the plant and/or soil.

The agricultural adjuvant of the present disclosure is made by combining and mixing the components of such composition described in the first aspect herein.

In a 1000 ml glass reactor equipped with a cooling system, 200.0 g of water and an amount between 60 to 85 g of dodecylbenzene sulphonic acid were mixed and then an amount of sodium hydroxide was added until the pH reaches neutrality. The reactor was then maintained at the room temperature for 1 h until the reaction mixture was cooled down. An amount 70 to 200 grams of sodium laurel ether sulphate and 50 to 100 g of a secondary alcohol ethoxylate were added to the vessel. Finally, 30 to 70 grams of a natural or synthetic oil such as black currant solid was added and heated to 50° C. The solution was then stabilized by adding 5 to 15 grams of urea, cooled down and an antioxidant such as the butyl hydroxy toluene and a preservative such as 2-phenoxy ethanol were added to the mixture.

Physico-chemical analyses were conducted on the agricultural adjuvant of this disclosure, with the following results:

Concentrate form of the agricultural adjuvant pH (value) 7-8 (at 20° C.)

Diluted form of the agricultural adjuvant pH buffer range from about pH 4 to about pH 8 (at 20° C.):

Initial boiling point and boiling range >100° C. at 1 atmosphere

Flash point >100° C. at 1 atmosphere

Flammability (solid, gas) not relevant, (fluid)

Vapour pressure 0.013 Pa at 25° C.

Relative density 1-1.1 at 20° C. (water=1)

The agricultural adjuvant of this disclosure has been found to be stable in concentrated form or in diluted form. Further, when the agricultural adjuvant is diluted and admixed with other agro-chemistries the tank mix remains stable without displaying unwanted side reaction such as precipitation of chemicals. The flashpoint of over about 100° C. at 1 atmosphere also shows an improvement in safety relative to the prior art showcased herein. This also impacts the ease and cost of manufacture.

In use the agricultural adjuvant also provides for stability over a buffered range from about pH 4 to about pH 8 making its use in a tank mix with other chemistries versatile. In the examples herein below, the agricultural adjuvant when diluted in water in low concentrations provides several advantages over the prior art.

The at least one polyphenol containing natural or synthetic oil composition which is used as a component of the agricultural adjuvant has not been found to be harmful to soil, plants or seed. This is in contrast to other natural oils such as orange oil and d-limonene which are known to display phytotoxic effects at certain concentrations in use.

Herein we show that the agricultural adjuvant of this disclosure is highly effective to aid and facilitate biological and/or physiological activity of active ingredients (such as a herbicide) but concomitantly does not have negative impacts on physico-chemical properties of active ingredients (such as a herbicide) present in a tank mix when in use.

In accordance with a fourth aspect of this disclosure there is provided use of the agricultural adjuvant described in the first aspect of this disclosure in agriculture, said use comprising the steps of:

(i) combining the agricultural adjuvant of the first aspect together with water and at least one agricultural compound selected from, but not limited to, the group comprising: insecticides, fungicides, herbicides, desiccants, defoliants, acaricides, nutrients, miticides, bactericides, biocides, ovicides, nematicides, insect growth regulators, plant growth regulators, and combinations thereof, to provide a mixture; and (ii) applying the mixture to plants, weeds, seeds, soil, urban places, and forests, via an apparatus selected from, but not limited to, the group comprising: air assisted sprayers, conventional sprayers, ultra-low volumes equipment such as aerial, electrostatic, foggers and misting spray equipment and chemigation systems, pivots, sprinklers, and combinations thereof.

In accordance with a fifth aspect of this disclosure there is provided an agricultural composition comprising:

at least one polyphenol containing natural or synthetic oil composition, which is preferably as described in the first to third aspects of the disclosure above;

at least one anionic surfactant, which is preferably as described in the first to third aspects of the disclosure above;

at least one nonionic surfactant, which is preferably as described in the first to third aspects of the disclosure above; and at least one pH adjuster, which is preferably as described in the first to third aspects of the disclosure above.

The agricultural composition of the fifth aspect of this disclosure may further include at least one of, but not limited to, the following group: insecticides, fungicides, herbicides, desiccants, defoliants, acaricides, nutrients, miticides, bactericides, biocides, ovicides, nematicides, insect growth regulators, plant growth regulators, fertilizers and combinations thereof.

The agricultural adjuvant of the fifth aspect of the invention may further include an essential oil and may be kumquat (*Citrus japonica*) oil. Kumquat oil may comprise at least one of, but not limited to, the following group: limonene (preferably d-limonene), alpha-pinene, bergamotene, caryophyllene, α-humulene, α-muurolene, isopropyl propanoate, terpinyl acetate, carvone, citronellal, 2-methylundecanal, nerol and trans-linalool oxide.

The agricultural composition according to the fifth aspect of the invention may be formulated and/or provided as a pesticide.

The agricultural composition may be for use in biocontrol applications, additionally or alternatively, as a biostimulant and/or a microbial stimulant. The agricultural composition may be safe for use with entomopathogenic nematodes (EPNs). The agricultural composition may be appropriate for post-harvest applications on crops and/or seeds.

The agricultural composition according to the fifth aspect of the invention is typically formulated with additional chemistries and/or a diluent. The agricultural composition may provide a tank mix partner providing in use a stable tank mix. The agricultural composition may provide an in-can formulation partner providing in use a stable in-can formulation. Stability is an important property to ensure effective use and/or application of the agricultural formulation to plant, soil and/or seed material.

The agricultural composition when in use in a tank mix and/in in an in-can formulation provides increased stability and hinders precipitation and/or gel formation. The agricultural composition further provides that the tank mix and/or the in-can formulation remains stable over a pH range of from about 4 to about 8 providing for versatility in use.

The agricultural composition may be provided as a tank mix and/or as an in-can formulation. Tank mixes may include multicomponent chemical-compositions mixed inside a tank from which irrigation and/or fertigation will take place. In-can formulations include multicomponent chemical-compositions within a single can (or container), wherein individual components may have different chemical properties when in use and wherein the single can (or container) may be sold as a standalone item including therein the different multi-components.

Without being limited to theory, the Applicant believes that the polyphenols of the present disclosure impart surprising and unexpected improvements in the physico-chemical properties over the prior art. It is the unique interaction between the various components that comprise the disclosure including the polyphenols that unexpectedly provide the advantages. There is no suggestion, motivation or hint in the prior art that would lead the skilled person to provide for the disclosure as herein described. The Applicant submits that arriving at its disclosure herein by relying on non suggestive prior art would require an inordinately voluminous amount of undue experimentation.

NON-LIMITING EXAMPLES

Non-limiting examples of the disclosure are provided here below. An agricultural adjuvant and/or agricultural composition according to the above aspects of the disclosure were prepared according to the Tables 1 to 5 below by way of example only.

The disclosures below are not to be construed as limiting. It is to be understood that the wt. % is a total for the formulation/composition prepared.

TABLE 1

Example embodiments of the disclosure

| Chemical component | Preferred range % w/w | More preferred range % w/w | Most preferred range % w/w |
|---|---|---|---|
| polyphenol containing natural or synthetic oil composition | 1 to 40 | 1 to 20 | 2 to 10 |
| anionic surfactant | 2 to 65 | 2 to 60 | 10 to 50 |
| nonionic surfactant | 2 to 25 | 2 to 20 | 5 to 10 |
| pH adjuster | 1 to 15 | 1 to 10 | 1 to 5 |
| diluent (water) | 20 to 85 | 40 to 60 | 50 to 60 |

TABLE 2

Further example embodiments of the disclosure

| Chemical component | Preferred range % w/w | More preferred range % w/w | Most preferred range % w/w |
|---|---|---|---|
| Diluent (example: water) | 30 to 70 | 40 to 60 | 50 to 60 |
| pH adjuster (example: sodium hydroxide) | 0.5 to 10 | 0.5 to 3 | 1 to 3 |
| anionic surfactant (example dodecyl benzene sulfonic acid) | 0.5 to 30 | 0.5 to 15 | 5 to 10 |
| anionic surfactant (example: sodium laurel ether sulphate) | 5 to 40 | 10 to 20 | 15 to 20 |
| non-ionic surfactant (example: primary or secondary alcohol C11-15 ethoxylates) | 3 to 15 | 5 to 20 | 5 to 10 |
| anionic surfactant (example: alkenes, C14-16 alpha, sulfonate) | 0.5 to 10 | 0.5 to 5 | 1 to 3 |
| polyphenol containing natural or synthetic oil composition (example: Ribes Nigrum (Black currant) seed oil | 1 to 40 | 2 to 20 | 2 to 10 |
| pH adjuster (example: citric acid) | 0.5 to 10 | 0.5 to 5 | 1 to 3 |

TABLE 3

Further example embodiments of the disclosure

| Chemical component | Preferred range % w/w | More preferred range % w/w | Most preferred range % w/w |
|---|---|---|---|
| Diluent (example: water) | 30 to 70 | 40 to 60 | 50 to 60 |
| pH adjuster (example: sodium hydroxide) | 0.5 to 10 | 0.5 to 3 | 1 to 3 |

TABLE 3-continued

Further example embodiments of the disclosure

| Chemical component | Preferred range % w/w | More preferred range % w/w | Most preferred range % w/w |
|---|---|---|---|
| anionic surfactant (example dodecyl benzene sulfonic acid) | 0.5 to 30 | 0.5 to 15 | 5 to 10 |
| anionic surfactant (example: sodium laurel ether sulphate) | 5 to 40 | 10 to 20 | 15 to 20 |
| non-ionic surfactant (example: primary or secondary alcohol C11-15 ethoxylates) | 3 to 15 | 5 to 20 | 5 to 10 |
| anionic surfactant (example: alkenes, C14-16 alpha, sulfonate) | 0.5 to 10 | 0.5 to 5 | 1 to 3 |
| polyphenol containing natural or synthetic oil composition (example: Ribes Nigrum (Black currant) seed oil | 1 to 40 | 2 to 20 | 2 to 10 |
| Essential oil (example: Citrus japonica oil) | 0.05 to 5 | 0.5 to 3 | 0.8 to 2 |
| pH adjuster (example: citric acid) | 0.5 to 10 | 0.5 to 5 | 1 to 3 |

TABLE 4

Further example embodiments of the disclosure

| Chemical component | Preferred range % w/w | More preferred range % w/w | Most preferred range % w/w |
|---|---|---|---|
| Diluent (example: water) | 30 to 70 | 40 to 60 | 50 to 60 |
| pH adjuster (example: sodium hydroxide) | 0.5 to 10 | 0.5 to 3 | 1 to 3 |
| anionic surfactant (example dodecyl benzene sulfonic acid) | 0.5 to 30 | 0.5 to 15 | 5 to 10 |
| anionic surfactant (example: sodium laurel ether sulphate) | 5 to 40 | 10 to 20 | 15 to 20 |
| non-ionic surfactant (example: primary or secondary alcohol C11-15 ethoxylates) | 3 to 15 | 5 to 20 | 5 to 10 |
| anionic surfactant (example: alkenes, C14-16 alpha, sulfonate) | 0.5 to 10 | 0.5 to 5 | 1 to 3 |
| polyphenols (example: Ribes Nigrum (Black currant) seed oil | 1 to 40 | 2 to 20 | 2 to 10 |
| Essential oil (example: Citrus japonica oil) | 0.05 to 5 | 0.5 to 3 | 0.8 to 2 |
| pH adjuster (example: citric acid) | 0.5 to 10 | 0.5 to 5 | 1 to 3 |
| Antioxidant (butyl hydroxy toluene) | 0.05 to 5 | 0.05 to 2 | 0.1 to 0.5 |
| Preservatives (example: 1,2 benzisothiazolin-3-one and/or 2-Phenoxy ethanol) | 0.1 to 5 | 0.3 to 3 | 0.4 to 1.5 |
| Stabiliser (example: urea) | 0.1 to 5 | 0.1 to 2 | 0.5 to 1.5 |

TABLE 5

Further example embodiments of the disclosure

| Chemical component | Preferred range % w/w | More preferred range % w/w | Most preferred range % w/w |
|---|---|---|---|
| Diluent (example: water) | 30 to 70 | 40 to 60 | 50 to 60 |
| pH adjuster (example: sodium hydroxide) | 0.5 to 10 | 0.5 to 3 | 1 to 3 |
| anionic surfactant (example dodecyl benzene sulfonic acid) | 0.5 to 30 | 0.5 to 15 | 5 to 10 |

TABLE 5-continued

Further example embodiments of the disclosure

| Chemical component | Preferred range % w/w | More preferred range % w/w | Most preferred range % w/w |
|---|---|---|---|
| anionic surfactant (example: sodium laurel ether sulphate) | 5 to 40 | 10 to 20 | 15 to 20 |
| non-ionic surfactant (example: primary or secondary alcohol C11-15 ethoxylates) | 3 to 15 | 5 to 20 | 5 to 10 |
| anionic surfactant (example: alkenes, C14-16 alpha, sulfonate) | 0.5 to 10 | 0.5 to 5 | 1 to 3 |
| polyphenols (example: Ribes Nigrum (Black currant) seed oil | 1 to 40 | 2 to 20 | 2 to 10 |
| pH adjuster (example: citric acid) | 0.5 to 10 | 0.5 to 5 | 1 to 3 |
| Antioxidant (example: butyl hydroxy toluene) | 0.05 to 5 | 0.05 to 2 | 0.1 to 0.5 |
| Preservatives (example: 1,2 benzisothiazolin-3-one and/or 2-Phenoxy ethanol) | 0.1 to 5 | 0.3 to 3 | 0.4 to 1.5 |
| Stabiliser (example: urea) | 0.1 to 5 | 0.1 to 2 | 0.5 to 1.5 |

All the embodiments of the disclosure in Tables 1 to 5 were stable liquids in the concentrated form. The concentrated forms were suitable for dilution to prepare diluted forms as described herein.

Conventionally, research on agricultural adjuvants was mainly based on empirical and heuristic studies with a central goal of maximising delivery of active ingredient. Consideration as to basic principles regarding a mode of action (MoA) was typically disregarded.

Practically, when providing agricultural adjuvants the following factors require investigation:

1) droplet formation of the adjuvant during flight from a nozzle of an irrigation or fertigation means to a target surface on a leaf of a plant;

2) contact (imping) of the adjuvant droplet on the leaf which results either in the adjuvant droplet being retained, or bouncing off of the leaf, or in the adjuvant drop shattering.

3) wetting or spreading process of the adjuvant on the leaf surface.

4) what happens on the leaf surface—properties of the adjuvant deposit?

5) penetration of the adjuvant through plant cuticular membrane (which is the first barrier for organic molecules to pass).

The physico-chemical nature of agricultural adjuvants may have a strong influence on individual factors (1) to (5) above, or on several factors concomitantly. Further, it can be seen that only are the physico-chemical properties of the adjuvant concentrate important, but also when diluted in water and applied in use to a leaf of a plant. The agricultural adjuvant of the first aspect of this disclosure in concentrate form provides for a stable, homogenous liquid. When diluted the agricultural adjuvant of this disclosure remains a stable emulsion or micro-emulsion and is buffered over a pH range.

The agricultural adjuvant according to the first aspect of this disclosure is investigated against an available commercial adjuvant regarding the above factors below.

Adjuvant Droplet Formation, Retention and Wetting

The agricultural adjuvant in concentrate form is diluted in accordance with the third aspect herein above.

In an example, preparation of the aqueous spray liquid solution including the agricultural adjuvant of this disclosure is provided in a tank of a boom sprayer.

The agricultural adjuvant of this disclosure includes at least one anionic and at least one non-ionic surfactant. Anionic and non-ionic surfactants have an impact on surface tension. Small amounts of anionic and/or non-ionic surfactants can cause alterations of the surface tension of the diluted adjuvant droplet. The interactions between the anionic and nonionic surfactants and the at least one polyphenol containing natural or synthetic oil composition are also important. The non-covalent bonding, ionic bonding, electrostatic interactions, hydrogen bonding, and van der Waals forces between the essential features of the agricultural composition of this disclosure (both in concentrate and/or dilute forms) facilitate providing the desirable physico-chemical properties in use. Surprisingly the agricultural adjuvant of this disclosure showed little foaming and without being limited to theory this is thought to be a function of the unique and unpredictable interaction between the various essential chemical components of the agricultural adjuvant.

The surface tension of the prior art WETCIT® (a commercially available adjuvant including on a natural orange oil terpene) and the adjuvant/agricultural composition of this disclosure (ORO-368) was monitored to characterise the surface tension. This value was measured by a ring method considering processes, like spreading or run-off effects. The test example ORO-368 was made as per Table 3 and particularly within the most preferred ranges provided therein.

Materials and Methods

Surface Tension

The surface tension of different dilutions of aqueous solutions of WETCIT® and the agricultural adjuvant of this disclosure (ORO-368) were investigated with the help of a Krüss Digital Tensiometer K10 (Krüss GmbH, Hamburg, Germany) using the 'Du Noüy' ring method. At least 10 replicates of each sample were measured per substance solution and a mean value was calculated. Between each measurement, the solution was left for at least 5 minutes to allow equilibration between vapor and liquid.

Contact Angle Measurement

Surface material Parafilm was used as an artificial, apolar control surface having no surface structures. A winter wheat cultivar *Triticum aestivum* was used as a model plant during growth stage BBCH 12 (2-leaf-stadium). The second leaf was sampled for contact angle measurements. Specimen slides were prepared with double-sided adhesive tape. Plant material was carefully placed on specimen slides. All plant material was transported and stored in a box with a wet paper towel to prevent fast transpiration. Contact angle measurements were performed with an optical contact angle measuring device OCA 20 (DataPhysics Instruments GmbH, Filderstadt, Germany). A 3 µL droplet was placed on the leaf surface by touching. At least 10 droplet replicates were measured per substance and surface. The contact angle was determined from the shadow image of the sessile droplet and analysed with the drop shape analysis (DSA) software. A contour recognition was initially carried out based on a grey-scale analysis of the image. In the second step, a geometrical model describing the drop shape is fitted to the contour (Krüss GmbH. Drop shape analysis). The contact angle is considered by the angle between the calculated drop shape function and the sample surface.

Results

Equilibrium Surface Tension

The surface tension of both adjuvants, WETCIT® and the agricultural adjuvant of this disclosure (ORO-368) diluted in water (w/v) at different dilution rates was determined by the ring method (Table 6). Pure water (dest.) was used as a control. At room temperature (20° C.), the surface tension value for water was defined at 72.75 mN m$^{-1}$. The ORO-368 shows a lower surface tension and lower contact angles providing for a superior adjuvant when compared to the commercially available WETCIT®. It is the unique combination of essential features of the agricultural adjuvant that allows these physico-chemical properties in use when diluted in water.

TABLE 6

Results of the equilibrium surface tension (STeq) using the ring method and the contact angle measured 60 s after droplet settling of the diluted samples of WETCIT and ORO 368.

| | Percent Dilution | | | | |
|---|---|---|---|---|---|
| SAMPLE | 0.50% | 0.20% | 0.10% | 0.05% | 0.01% |
| Product | Equilibrium Surface Tension (mN/n) | | | | |
| WETCIT | 31.6 | 31.6 | 31.9 | 31.9 | 31.7 |
| OR-368 | 28 | 28 | 28.6 | 28.2 | 28.3 |
| Product | Contact Angle (°) | | | | |
| WETCIT | 41.95 | 46.45 | 45.9 | 42.45 | 45 |
| OR-368 | 30.1 | 30.5 | 31.6 | 34.65 | 38.25 |

Contact Angle Measurement

The determination of time-dependent sessile contact angles (CA) was carried out to characterise the surfactant wetting and spreading potential. The process of droplet spreading after 2 seconds, 30 s and finally 60 s after droplet settling was studied. Parafilm was used as an artificial control surface considering differences between selected surfactant samples. In Table 6 are shown the average results of the 60 s data. In table 7 the analysis over the 2, 30 and 60 s period. All samples were dissolved in water at different dilutions Pure water (distilled) was adopted as control experiment. During the complete time interval of 60 s water contact angle remained constant at a value of about 107°. Between the surfactants, a slight difference became visible (Table 7). WETCIT® CAs values were around 55° which decreased during the first minute. ORO-368 showed the highest decrease in CA during the first minute after droplet application and lower, compared to the pure water. Moreover, all the contact angles decreased steeply during the first 30 s.

TABLE 7

Mean of the contact angle [°] of the water diluted formulations of WETCIT ® and ORO 368 after 2, 30 and 60 s after droplet settling

| | Sample | | |
|---|---|---|---|
| WETCIT 0.5% | 52.35 | 45.6 | 41.95 |
| WETCIT 0.2% | 57.90 | 49.3 | 46.45 |
| WETCIT 0.1% | 52.1 | 47.4 | 45.9 |
| WETCIT 0.05% | 51.2 | 46.3 | 42.45 |

TABLE 7-continued

Mean of the contact angle [°] of the water diluted formulations of WETCIT ® and ORO 368 after 2, 30 and 60 s after droplet settling

| | Sample | | |
|---|---|---|---|
| WETCIT 0.01% | 54.7 | 49.1 | 45 |
| ORO-368 0.5% | 43.2 | 37.3 | 30.1 |
| ORO-368 0.2% | 42.9 | 36.7 | 30.5 |
| ORO-368 0.1% | 43.0 | 38.2 | 31.6 |
| ORO-368 0.05% | 45.9 | 40.1 | 34.65 |
| ORO-368 0.01% | 47.6 | 42.2 | 38.25 |

Additional contact angle measurements were taken comparing the disclosure ORO-368 against prior art adjuvants. The contact angle for the water used was 94°. The contact angle for water plus commercial crop oil concentrate (COC was 58°. The contact angle for water plus commercial modified seed oil (MSO) was 59°. The contact angle for water plus commercial non-ionic surfactant (NIS) was 38°. And finally the contact angle for water plus ORO-368 was 29°. This shows a significant improvement over standard prior art adjuvants. Further, spreading and deposition properties were evaluated. FIG. 1 shows the superior spreading and deposition properties of ORO-368 against prior art standard adjuvants. A hallmark of an effective agricultural adjuvant includes its ability to facilitate spreading over a surface. FIG. 1 was generated by applying ORO-368 and the prior art adjuvants to paper.

Field Trials

Figure 2:
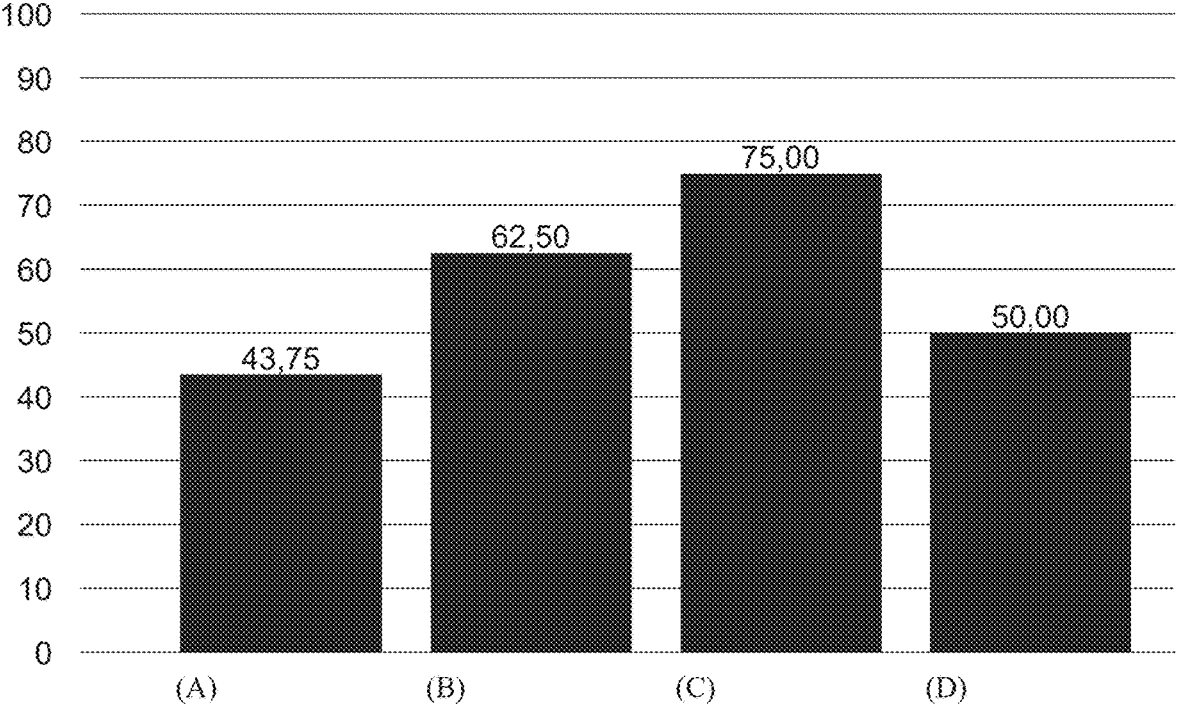
FIG. 2 shows efficacy and crop selectivity of ORO-368 were conducted in a tank mix against *Septoria tritici* in wheat.

Efficacy and crop selectivity of ORO-368 were conducted in a tank mix against *Septoria tritici* in wheat. A standard fungicide was used called AMPERA® to evaluate the efficacy of ORO-368 as an adjuvant. AMPERA® includes prochloraz and tebuconazole as active ingredients. The experiment protocol is shown below and the results are shown in FIG. 2. FIG. 2 (A) shows AMPERA® alone, (B) shows AMPERA® plus ORO-368 at 0.25%, (C) shows AMPERA® plus ORO-368 at 0.5%, and (D) shows AMPERA® plus prior art WETCIT® at 0.25%. From FIG. 9 it can clearly be seen that ORO-368 shows improvements over the prior art, and functions well to bolster the effect of an active ingredient. The results of FIG. 2 are seven (7) days after application.

TABLE 8

Trial protocol for efficacy and crop selectivity of ORO 368 against *Septoria tritici* in wheat.

| Treatment no. | Type | Name | Concentration | Type | Rate |
|---|---|---|---|---|---|
| 1 | Control/ Untreated | Untreated control | 400 g/L | EC (emulsifiable concentrate) | 1.5 liters per hectare |
| 2 | Fungicide | AMPERA | 400 g/L | EC | 1.5 liters per hectare |
| 3 | Fungicide plus ORO-368 adjuvant | AMPERA | 400 g/L | EC | 1.5 liters per hectare |
| 4 | Fungicide plus ORO-368 adjuvant | AMPERA | 400 g/L | EC | 1.5 liters per hectare |

TABLE 8-continued

Trial protocol for efficacy and crop selectivity
of ORO 368 against *Septoria tritici* in wheat.

| Treatment no. | Type | Name | Concen- tration | Type | Rate |
|---|---|---|---|---|---|
| 5 | Fungicide plus ORO-368 adjuvant | AMPERA | 400 g/L | EC | 1.5 liters per hectare |

Replications 4. Untreated treatments 1. Conduct under GLP/GEP: YES. Design: random-ized complete block. Treatment units: Treated plot experimental unit size width 4 meters, length 6 meters. Application volume 200 L/ha.

Figure 3:
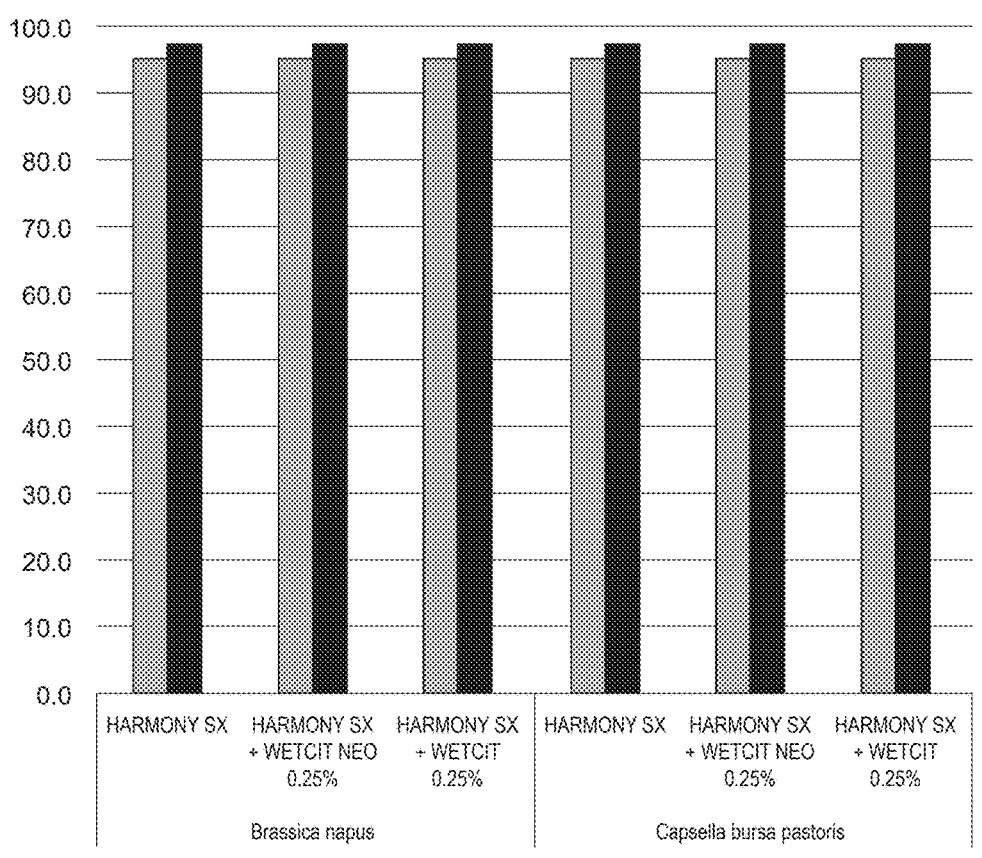
FIG. 3 shows efficacy trials with an herbicide in maize and unwanted plants/weeds.
Figure 4:
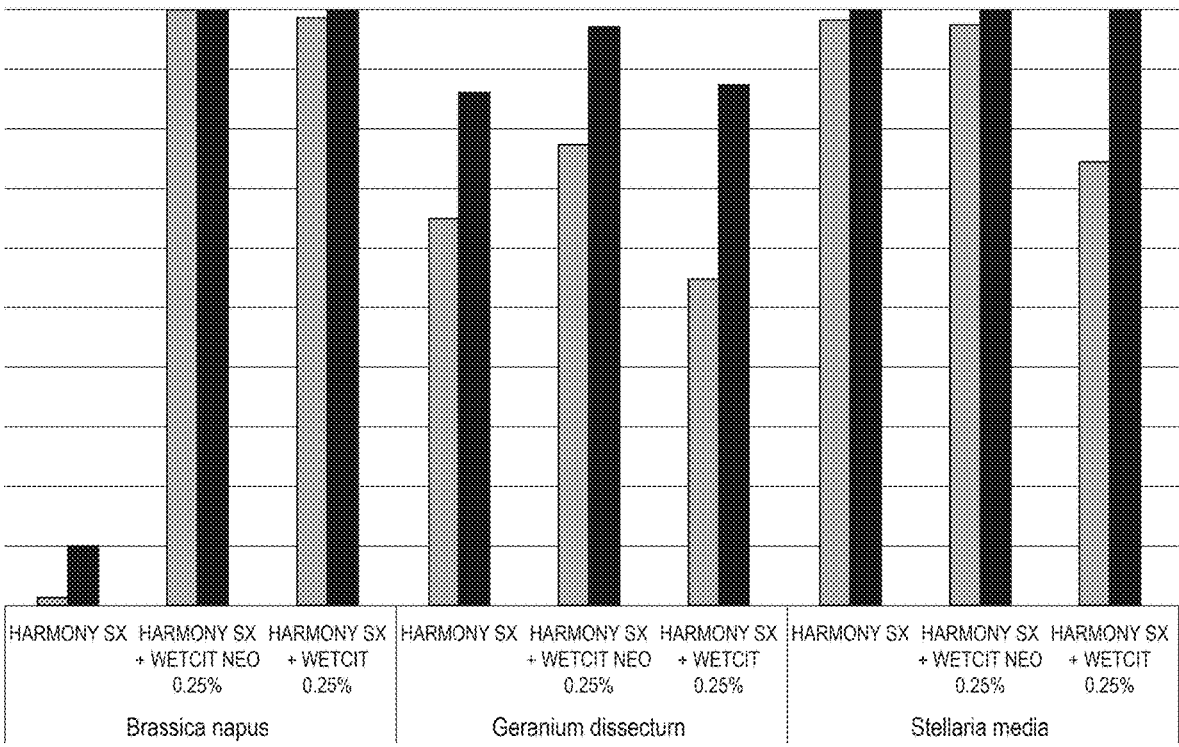
FIG. 4 shows efficacy trials with an herbicide in maize and unwanted plants/weeds.

FIGS. 3 and 4 shows efficacy evaluation of ORO-368 with a herbicide sold as HARMONY® SX in maize thirteen (13) [*] and twenty-one (21) [**] days after application. HARMONY® SX includes thifensulfuron as active ingredient.

TABLE 8

Trial protocol for efficacy evaluation of ORO 368
with an herbicide sold as HARMONY SX in maize.

| Treatment no. | Type | Name | Concen- tration | Type | Rate |
|---|---|---|---|---|---|
| 1 | Control | | 15 g/hectare | Tank mix emulsion | 7.5 g ai/ha |
| 2 | Herbicide | HARMONY | 15 g/hectare | Tank mix emulsion | 7.5 g ai/ha |
| 3 | Herbicide and ORO 368 | HARMONY plus ORO 368 | 15 g/hectare | Tank mix emulsion | 7.5 g ai/ha |
| 4 | Herbicide plus WETCIT ® | HARMONY plus WETCIT | 15 g/hectare | Tank mix emulsion | 7.5 g ai/ha |

Replications 4. Untreated treatments 1. Conduct under GLP/GEP: YES. Design: random-ized complete block. Treatment units: Treated plot experimental unit size width 4 meters, length 6 meters. Application volume 200 L/ha.

FIGS. 3 and 4 show the efficacy of against a range of pests in maize. 100% efficacy indicates the elimination of the weed or unwanted plant. It is shown that the adjuvant of ORO-368 (also WETCIT® NEO in FIGS. 3 and 4) is in fact effective in bolstering the effect of the herbicide.

CONCLUSIONS

Surface Tension Measurements

All experiments were conducted using different surfactant concentrations for WETCIT® and ORO-368 in water. These concentrations were selected because it is in-between the typical range of commonly used WETCIT® concentrations for agricultural spray formulations and more importantly, this value is high above the critical micelle concentration (cmc).

All the dilutions of the surfactant samples were able to decrease the surface tension to the critical value of about 55 to 60 mN m$^{-1}$.

The lowest measured value was 28 mN m$^{-1}$ for ORO-368 demonstrates surface tension lowering properties that will improve retention effects for spraying superhydrophobic plant surfaces.

The Applicant submits that the disclosure herein ameliorates disadvantages known from the prior art.

The invention claimed is:

1. An agricultural adjuvant, comprising:

black currant (*Ribes nigrum*) seed oil in an amount between 2 wt. % and 10 wt. %;

dodecylbenzene sulfonic acid in an amount between 5 wt. % and 10 wt %;

sodium laurel ether sulphate (SLES) in an amount between 15 wt. % and 20 wt. %;

a primary or secondary alcohol (C$_{11}$-C$_{15}$) ethoxylate, in an amount of between 5 wt. % to 10 wt. %;

at least one pH adjuster selected from the group consisting of sodium hydroxide and citric acid monohydrate in an amount of between 1 wt. % to 3 wt. %, wherein the wt. % is a total for the adjuvant;

at least one additive selected from the group consisting of a preservative, stabilizer, antioxidant, and combination thereof, wherein the preservative is at least one of 1,2 benzisothiazolin-3-one and 2-phenoxyethanol in an amount between 0.4 wt. % and 1.5 wt. %, the stabilizer is urea in an amount between 0.5 wt. % and 1.5 wt. %, and the antioxidant is butylhydroxytoluene in an amount between 0.1 wt. % and 0.5 wt. %; and water from 50 to 60 wt. %.

2. The agricultural adjuvant of claim 1, further comprising kumquat (*Citrus japonica*) oil.

3. The agricultural composition of claim 1, further comprising at least one polyphenol containing natural or synthetic oil composition comprising a natural oil composition of vegetable origin selected from the group consisting of: apples, grapes, peaches, grapefruit, cherries, blueberries, pomegranate, raspberries, cranberries, black elderberries, plums, blackberries, apricots, spinach, onions, shallots, potatoes, olives, artichoke, broccoli, asparagus, carrots, cereals, wheat, rye, and oat, soybeans, black beans, white beans, chestnuts, hazelnuts, pecans, almonds, walnuts, flaxseed, coffee, tea, sesame, cocoa, capers, saffron, oregano, rosemary, cloves, peppermint, star anise, celery, sage, spearmint, thyme, basil, ginger, cumin, and cinnamon.

4. The agricultural composition of claim 1, further comprising kumquat (*Citrus japonica*) oil.

5. The agricultural composition of claim 1, wherein said composition provides a pesticidal agricultural composition.

\* \* \* \* \*